(12) United States Patent
Schäfer et al.

(10) Patent No.: US 7,308,876 B2
(45) Date of Patent: Dec. 18, 2007

(54) ELECTRICALLY DRIVEN CAMSHAFT ADJUSTER

(75) Inventors: Jens Schäfer, Herzogenaurach (DE); Martin Steigerwald, Erlangen (DE); Jörg Degelmann, Bindlach-Benk (DE); Jon Heywood, Pettstadt (DE)

(73) Assignee: Schaeffler KG, Herzogenaurach (DE)

( * ) Notice: Subject to any disclaimer, the term of this patent is extended or adjusted under 35 U.S.C. 154(b) by 0 days.

(21) Appl. No.: 10/531,787

(22) PCT Filed: Oct. 16, 2003

(86) PCT No.: PCT/EP03/11455

§ 371 (c)(1),
(2), (4) Date: Mar. 15, 2006

(87) PCT Pub. No.: WO2004/035998

PCT Pub. Date: Apr. 29, 2004

(65) Prior Publication Data

US 2006/0201462 A1 Sep. 14, 2006

(30) Foreign Application Priority Data

Oct. 17, 2002 (DE) .............................. 102 48 351

(51) Int. Cl.
*F01L 1/34* (2006.01)
(52) U.S. Cl. .................. 123/90.17; 123/90.15
(58) Field of Classification Search ............. 123/90.11, 123/90.15, 90.17, 90.27, 90.31; 251/129.01
See application file for complete search history.

(56) References Cited

U.S. PATENT DOCUMENTS

| 3,187,360 | A | | 6/1965 | Spohr |
|---|---|---|---|---|
| 3,593,933 | A | | 7/1971 | Grashorn |
| 4,806,809 | A | | 2/1989 | Kubota et al. |
| 4,986,801 | A | | 1/1991 | Ohlendorf et al. |
| 5,509,324 | A | | 4/1996 | Cymbal |
| 5,680,837 | A | | 10/1997 | Pierik |
| 5,687,690 | A | * | 11/1997 | Kamiyama et al. ..... 123/198 R |
| 5,709,605 | A | | 1/1998 | Riefe et al. |
| 6,457,446 | B1 | | 10/2002 | Willmot |
| 6,637,389 | B2 | * | 10/2003 | Schafer et al. ........... 123/90.17 |
| 6,981,478 | B2 | * | 1/2006 | Schafer et al. ........... 123/90.17 |
| 7,032,552 | B2 | * | 4/2006 | Schafer et al. ........... 123/90.17 |
| 7,089,897 | B2 | * | 8/2006 | Schafer et al. ........... 123/90.17 |

(Continued)

FOREIGN PATENT DOCUMENTS

AT        354 610        1/1980

(Continued)

*Primary Examiner*—Ching Chang
(74) *Attorney, Agent, or Firm*—Volpe and Koenig PC

(57) ABSTRACT

The invention relates to a camshaft adjuster (1) for adjusting and fixing the relative position of the angle of rotation of a camshaft (8) in relation to a crankshaft of a reciprocating piston internal combustion engine. The adjusting device comprises a high transmission and friction-reduced adjusting gear mechanism (2), comprising a drive shaft which is rotationally fixed to the crankshaft, a driven shaft which is rotationally fixed to the camshaft (8) and an adjusting shaft (9) which is connected to an adjusting motor shaft (10) of an adjusting motor. A camshaft adjuster (1), which is economical to run, can be produced such that the adjusting gear mechanism (2) and the adjusting motor (3) are embodied as separate units and are connected together by a rotational backlash-free, disengaging coupling (4).

15 Claims, 9 Drawing Sheets

U.S. PATENT DOCUMENTS 7,089,997 B2 *  8/2006  Weng et al. .................. 165/60

FOREIGN PATENT DOCUMENTS

| | | |
|---|---|---|
| DE | 34 18 544 | 11/1985 |
| DE | 43 01 647 | 7/1994 |
| DE | 101 01 938 | 8/2001 |
| EP | 1 046 792 | 10/2000 |
| GB | 2 221 513 | 2/1990 |

* cited by examiner

"X - X"

ELECTRICALLY DRIVEN CAMSHAFT ADJUSTER

BACKGROUND

The invention relates to a camshaft adjuster for adjusting and fixing the position of the angle of rotation of the camshaft relative to the crankshaft of a reciprocating-piston internal-combustion engine, especially according to the preamble of claim 1.

In DE 41 10 195 A1, a camshaft adjuster for adjusting and fixing the relative position of the angle of rotation of a camshaft relative to the crankshaft of a reciprocating-piston internal-combustion engine is disclosed, with a high transmission and friction-reduced adjusting gear mechanism comprising a drive shaft, which is connected rigidly to the crankshaft, a driven shaft, which is rotationally fixed to the camshaft, and an adjusting shaft, which is connected to an adjusting motor shaft of an adjusting motor.

In this solution, the adjusting motor shaft is formed integrally with the adjusting shaft of the adjusting gear mechanism. Therefore, when the adjusting motor fails, the entire camshaft adjuster always has to be replaced. In addition, the assembly itself is complicated, because preassembly of the complete adjusting motor is impossible.

SUMMARY

The invention is based on the objective of creating a camshaft adjuster, which is economical to run.

According to the invention, the problem is solved by the features of the independent claim 1. Through the separate formation of adjusting motor and adjusting gear mechanism, the adjusting motor can be completely pre-assembled and installed or replaced in a simple way due to the disengaging coupling. Because the coupling is free from rotational backlash, its operation is guaranteed to exhibit low wear and low noise.

The arrangement according to the invention of a disengaging coupling between the adjusting gear mechanism and adjusting motor is independent of the type of adjusting motor. Especially preferred is the electric adjusting motor. In contrast with a hydraulic motor, the electric motor has the advantage of functioning independent of the engine speed of the internal-combustion engine and thus it also functions when the internal-combustion engine is stopped. In addition, the oil viscosity has no effect on its function. In contrast with a pneumatic motor, the electric adjusting motor has the advantage, in the normal case, of an already existing power supply and uncomplicated control.

Manufacturing and thus cost advantages are provided when the coupling has two parts that can be joined together, of which one is rotationally fixed to the adjusting motor shaft and the other is rotationally fixed to the adjusting shaft.

A simple assembly of the adjusting motor is achieved in that one of the two parts is formed as an outer part and the other is formed as an inner part, wherein the two parts can be inserted one into the other in a play-free way.

An advantageous improvement of the invention is provided in that the coupling is formed as a profiled shaft coupling, preferably as a two-side shaft coupling, which has two coupling surfaces on each outer part and two coupling surfaces on each inner part, wherein preferably the latter has rotational backlash-reducing means. The proven two-side shaft coupling offers sufficient room for mounting torque-transferring and rotational backlash-reducing means. As couplings, feather key and profiled shaft couplings, such as polygonal, toothed, wedge, and multi-edge shaft couplings, are also possible. Also, a shaft milled on one side with a corresponding counter piece (similar to the two-side shaft but with only one straight surface) is likewise conceivable. The mounting of the rotational backlash-reducing means on the inner part offers assembly and structural space advantages in comparison with mounting these means on the outer part, which is also possible.

A conventional solution can be seen in that as rotational backlash-reducing means, a minimal, tightly tolerance play is provided between the coupling surfaces of the inner and outer parts. The resulting necessary manufacturing precision requires corresponding construction expense.

A more economical solution is provided in that as rotational backlash-reducing means, biased metal or plastic springs are provided, which bridge the play between the coupling surfaces. Due to the biasing of the springs and their sufficient spring path, the play between the coupling surfaces and its tolerance can be selected relatively large, whereby the construction expense is reduced accordingly.

It is advantageous that the metal springs are formed as flat bending or plate springs and the plastic springs are formed preferably as polymer bands or polymer O-rings and arranged preferably in grooves or in a circular groove of the coupling surfaces of the inner part. The mounting of the polymer springs in annular grooves of the coupling surfaces of the inner part simplifies above all the assembly of the polymer band and the polymer O-ring, which are arranged there so that they are secure from becoming lost.

The spring and assembly forces required for torque transfer and rotational backlash reduction are relatively low, because the torque to be transferred, less than 1 Nm, is relatively minimal, so that no relative rotation of the electric motor and the adjusting shaft occurs for the corresponding spring stiffness. The springs can also compensate for small alignment errors of these shafts. There are advantages when the flat bending or plate springs are formed as one-piece spring clasps, which preferably clip onto corners of the inner part. In this way, pairs of the flat bending or plate springs form one unit, which is fixed on the inner part so that it is secure from becoming lost and thus simplifies the assembly of the adjusting motor.

One advantageous configuration of the invention is provided in that the coupling is formed as a tubular shaft coupling, with a hollow cylindrical outer part and a coaxial, cylindrical inner part, which is arranged with play in the outer part and which preferably has rotational backlash-reducing means. The two parts are formed as turned parts, which are simple and economical to produce. Likewise, it is advantageous if as rotational backlash-reducing means an elastically deformable, preferably metal tolerance ring is provided, which is arranged in a radial groove, preferably on the periphery of the coaxial, cylindrical inner part, and which extends past this part by a certain extent in the radial direction. In principle, the tolerance ring could also be arranged on the inner periphery of the outer part, but the arrangement according to the invention is more assembly-friendly.

Due to the projection of the tolerance sleeve, in the assembly, a spring-elastic deformation of the same is produced, which leads to a frictional connection between the inner and outer parts. In the selection of the projection, it must be taken into account that the torque of the adjusting motor can be transferred without essentially preventing the axial movement of the inner and outer parts relative to each other and thus expansion due to heat. The tolerance ring is also conceivable as a polymer ring.

Through one advantageous configuration of the invention, it is achieved that at least one locking ball or one preferably cylindrical locking pin with a conical end is provided as rotational backlash-reducing means, which are guided in radial bore holes or through holes, preferably of the coaxial, cylindrical inner part with play and which can be displaced into other radial bore holes of smaller diameter, aligned with the bore holes mentioned above, in the hollow cylindrical outer part under the force of a compression or through spring by a measure limited by the smaller diameter. Instead of the one locking element, advantageously there can also be two or more locking balls or cylindrical locking pins. These could also be arranged in the outer part and engage radially in a corresponding bore hole of the inner part. As an alternative to the cylindrical pins, pins, for example, with square or rectangular or also any other cross section can also be used. In this variant, small alignment errors between the adjusting motor shaft and adjusting shaft can also be compensated. The through hole has the advantage of simpler production and a uniform application of pressure on the locking balls or locking pins in comparison with the two radial bore holes, which are replaced by this through hole.

Through corresponding design of the spring force of the compression or through springs and/or the cone angle of the cylindrical pins, the transferable torque of the tubular coupling can be limited. This then acts as a safety coupling, in that for an overload, the locking balls or the cylindrical locking pins are displaced from the bore holes in the outer part against the relatively small spring forces and thus the two shafts are disengaged. For axial movement of the tubular shaft coupling equipped with locking balls or with cylindrical locking pins, it is necessary that the other radial bore holes are formed as elongated holes aligned in the axial direction.

It is advantageous when the coupling is formed as a clutch coupling, whose two parts have axial claws, which are arranged at the same diameter and which engage in each other, wherein between the claws, there are distances, which are bridged by tooth elements of an elastic, biased polymer collar in a rotational backlash-free way. The clutch coupling also enables the equalization of a small axis offset due to the elasticity of the polymer collar. In addition, it acts as a vibration damper.

Another advantageous coupling is formed as a profiled shaft coupling, preferably a toothed shaft coupling, whose inner and outer part, especially whose internal and external gearing, is formed from elastic plastic. In view of the relatively low torque to be transferred, many kinds of couplings, for example, polygonal or multi-edge shaft couplings, are suitable for half-side formation in plastic. The toothed shaft coupling is distinguished by especially simple assembly. Due to the elastic plastic toothed collar, it also enables the compensation of slight axis offset. Likewise, it acts as a vibration damper due to the intrinsic damping of the plastic.

For economical production and compact construction, it is advantageous that the internal or external gearing composed of plastic is molded directly onto corresponding parts of the toothed shaft coupling or onto a correspondingly formed metallic intermediate bushing and that the intermediate bushing is connected to the toothed shaft coupling, preferably through a force-fit connection.

An advantageous configuration of the invention is provided in that the coupling is formed as a magnetic shaft coupling, whose two parts have opposing permanent magnets, which transfer the driving moment of the adjusting motor through magnetic forces in a contact-less and rotational backlash-free way from the adjusting motor shaft to the adjusting shaft. The permanent magnets can be produced from ferrite or rare-earth material, such as samarium cobalt or neodymium iron boron. Due to the minimal torque to be transferred from the adjusting motor shaft to the adjusting shaft, this is entrained by the magnetic force approximately synchronously, that is, in a rotational backlash-free way. This coupling can also be formed as a safety coupling, which slips if there is an overload. Because the coupling is a contact-less coupling, the torque is transferred with reduced vibration. In addition, a small axis offset can also be compensated.

It is advantageous when the permanent magnets are arranged preferably in the axial direction and between them there is a non-magnetic membrane with two-sided play, which closes the adjusting motor in an oil-tight way. In an axial arrangement of the magnets, it must be taken into account that their maximum distance permitted for the transfer of the torque is not exceeded. On the other hand, the permanent magnets may not touch the membrane. In contrast, the similarly possible radial arrangement of the magnets is for the most part not sensitive to axial displacement, but the formation of a membrane between these permanent magnets is more difficult.

BRIEF DESCRIPTION OF THE DRAWINGS

Additional features of the invention emerge from the following description and the associated drawings, in which embodiments of the invention are shown schematically. Shown are.

DETAILED DESCRIPTION OF PREFERRED EMBODIMENTS

Figure 1:
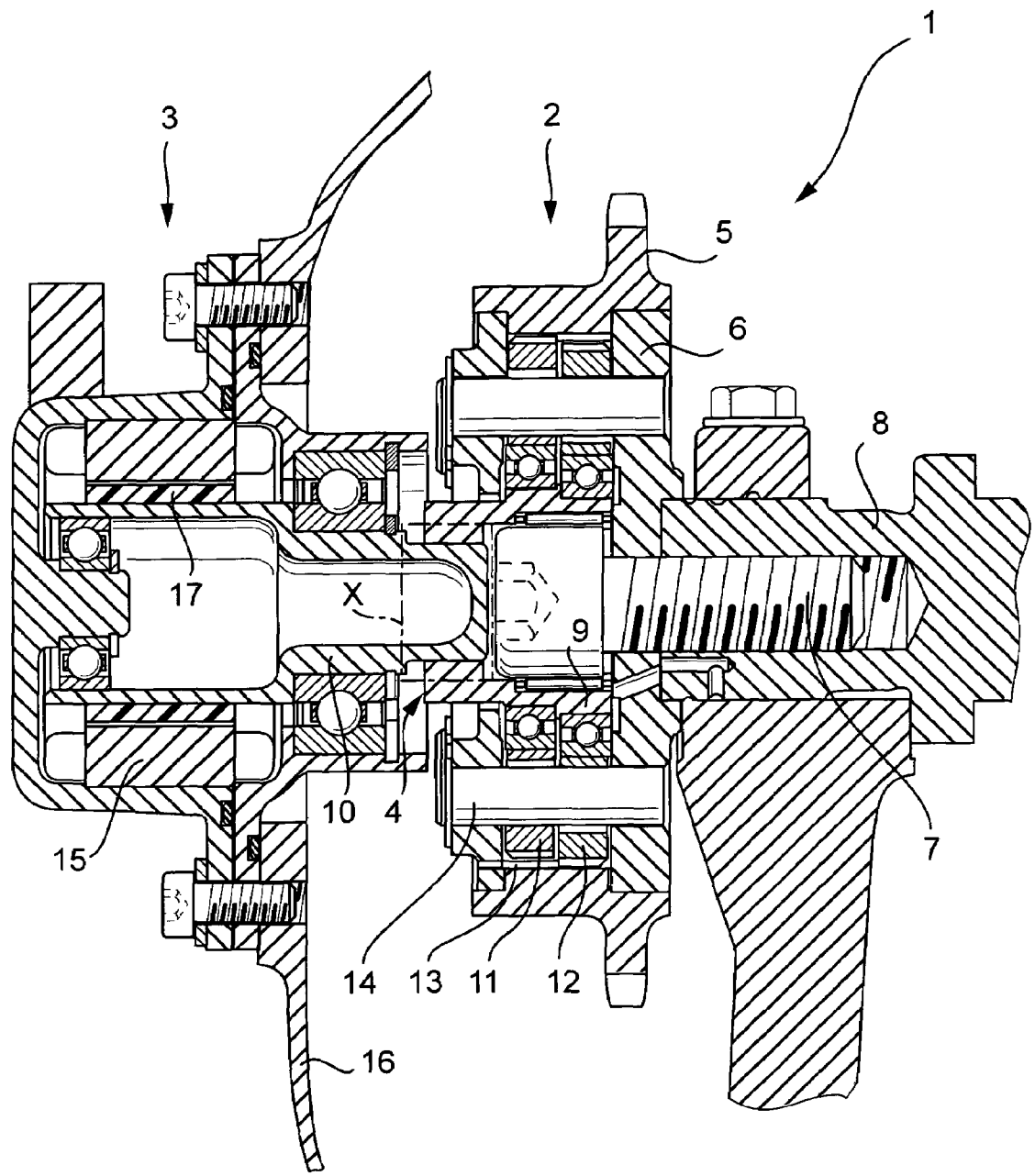
FIG. 1 a camshaft adjuster with separate electrical adjusting motor and adjusting gear mechanism, which are connected by a two-side shaft coupling so that they can be disengaged from each other.

In FIG. 1, an electrical camshaft adjuster 1 is shown, with an adjusting gear mechanism 2 and an electrical adjusting motor 3 which are formed as separate units and can be connected by a coupling so that they can be disengaged from each other.

The adjusting gear mechanism 2 is a three-shaft gear mechanism, which exhibits a high transmission (transmission range from 1:30 to 1:250) and a high efficiency as an eccentric gear mechanism. The adjusting gear mechanism 2 has a drive shaft and a driven shaft, as well as an adjusting shaft 9. The drive shaft is formed as a chain wheel 5 and is rotationally fixed to a not shown crankshaft by means of a similarly not shown chain. The driven shaft is configured as a closing wall 6, which is rotationally fixed to a camshaft 8 by means of a tension screw 7. The adjusting shaft 9 is formed as an eccentric shaft, which is connected to an adjusting motor shaft 10 in a practically rotational backlash-free manner, but so that it can move in the axial direction, via a two-side shaft coupling 4. The adjusting shaft 9 is used for driving two spur pinions 11, 12, which mesh with internal gearing 13 of the chain wheel 5 and transfer the adjusting moment via pins 14 and via the closing wall 6 to the camshaft 8. The electrical adjusting motor 3 has a stator 15, which is fixed to the cylinder head 16, and a permanent magnet rotor 17, which turns with the camshaft 8.

Figure 2:
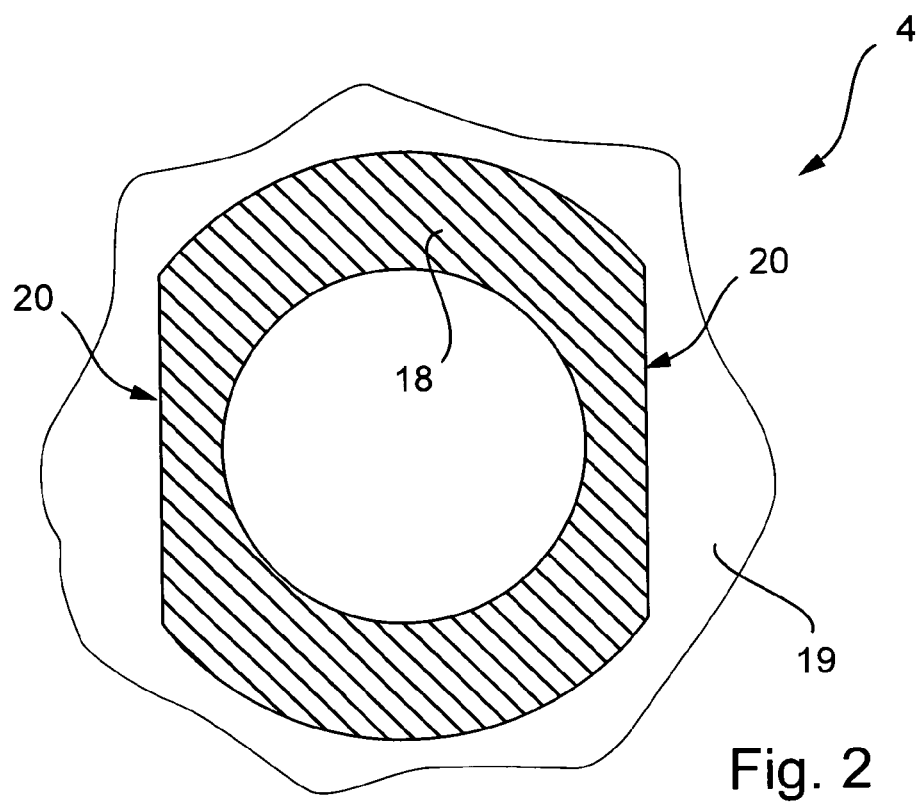
FIG. 2 a two-side shaft coupling according to detail X from FIG. 1 in cross section.
Figure 3:
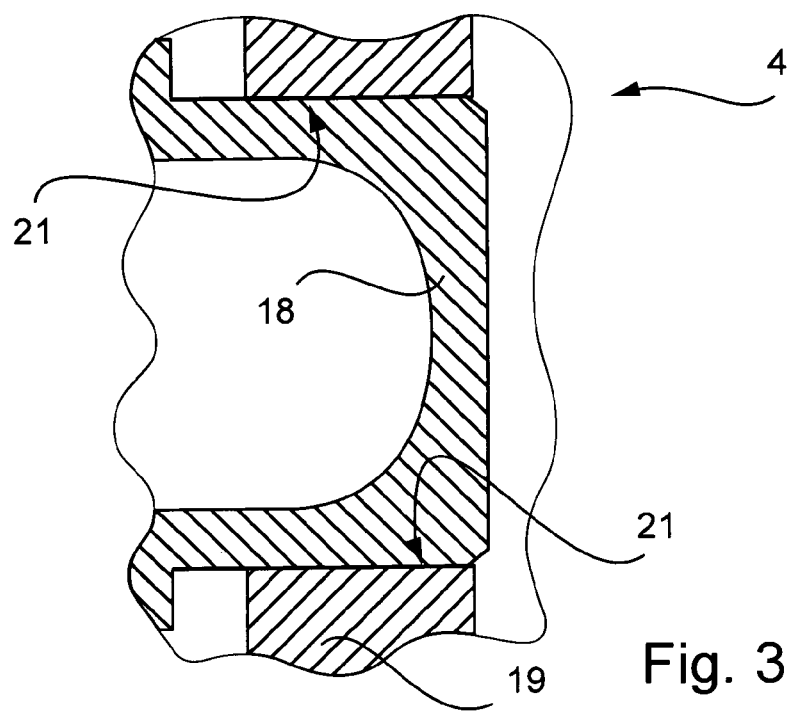
FIG. 3 a longitudinal section through the two-side shaft coupling from FIG. 2.

In FIGS. 2 and 3, the two-side shaft coupling 4 designated as detail X from FIG. 1 is shown enlarged in a cross section and a longitudinal section view. An inner part 18 of the two-side shaft coupling 4 is formed integrally with the adjusting motor shaft 10, and an outer part 19 is formed integrally with the adjusting shaft 9. Both parts 18, 19 each have identical coupling surfaces 20, 21, between which the minimal play required for axial displacement (heat expansion, assembly) is provided. In this way, a minimal rotational backlash is also achieved, which is important for the durability and low-noise operation of the two-side shaft coupling 4, on which changing moments are applied. However, the manufacturing expense required for the minimal backlash and tolerances on both parts 18, 19 is considerable.

Figures 4, 5:
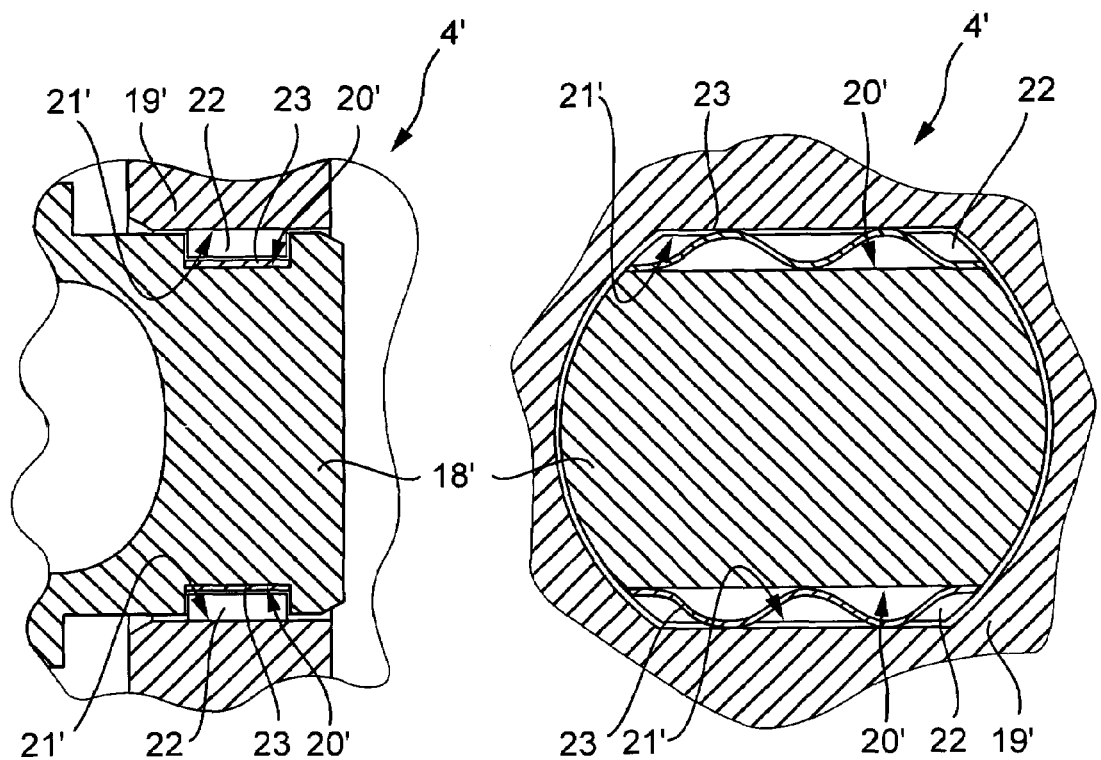
FIG. 4 a longitudinal section through a two-side shaft coupling similar to FIG. 3, but with torque-transferring and rotational backlash-reducing metal springs.
FIG. 5 a cross section through the two-side shaft coupling from FIG. 4.

This disadvantage is countered by a two-side shaft coupling 4' shown in a longitudinal section and cross section in FIGS. 4 and 5. Here, a groove 22, in which a flat bending or a plate spring 23 is inserted with biasing, is provided in the coupling surfaces 20' of each of the inner parts 18'. The springs 23 bridge the now permitted, relatively large play between the inner and outer parts 18', 19' through the biasing and the spring path and take over the transfer of the torque of the adjusting motor 3. Because this torque, at <1 Nm, is relatively small, the necessary spring and assembly forces are also small and there is no rotation between the adjusting shaft and adjusting motor shaft 9, 10 for the corresponding spring stiffness. Because the torque of the adjusting motor 3 is now transferred via the springs 23, the coupling surfaces 20', 21' do not contact the parts 18', 19'. The springs 23, in connection with the relatively large play between the coupling surfaces 20', 21', are in the position to compensate for small axis offsets between the adjusting shaft and the adjusting motor shaft 9, 10.

Figure 6:
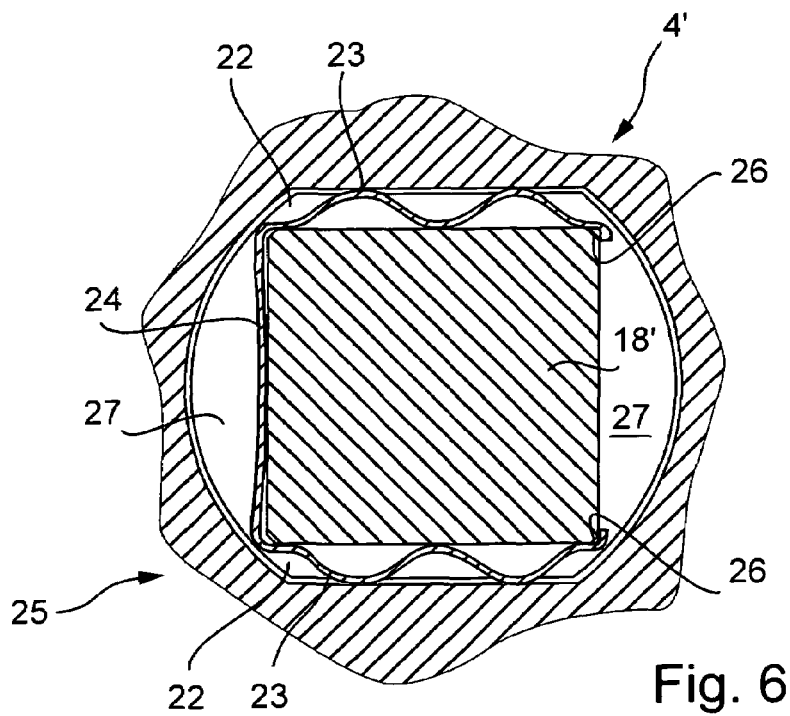
FIG. 6 a cross section through a two-side shaft coupling similar to FIG. 5, but with one-piece spring clasps.

FIG. 6 shows a coupling 4' as a variant to FIGS. 4 and 5, for which the two springs 23 and the grooves 22 of the inner part 18' are joined by a spring clip part 24 into a one-piece spring clasp 25, which locks onto corners 26 of the inner part 18' in a way such that it cannot be lost. This loss safety means a considerable simplification in terms of assembly.

Figure 7:
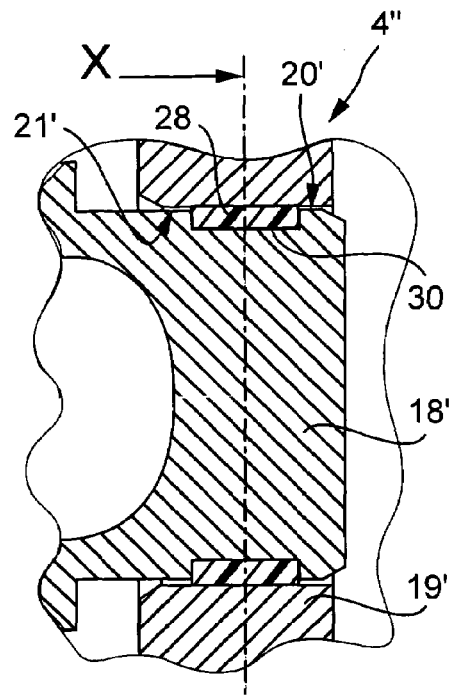
FIG. 7 a longitudinal section through a two-side shaft coupling similar to FIG. 4, but with a flat band as a polymer spring.
Figure 9:
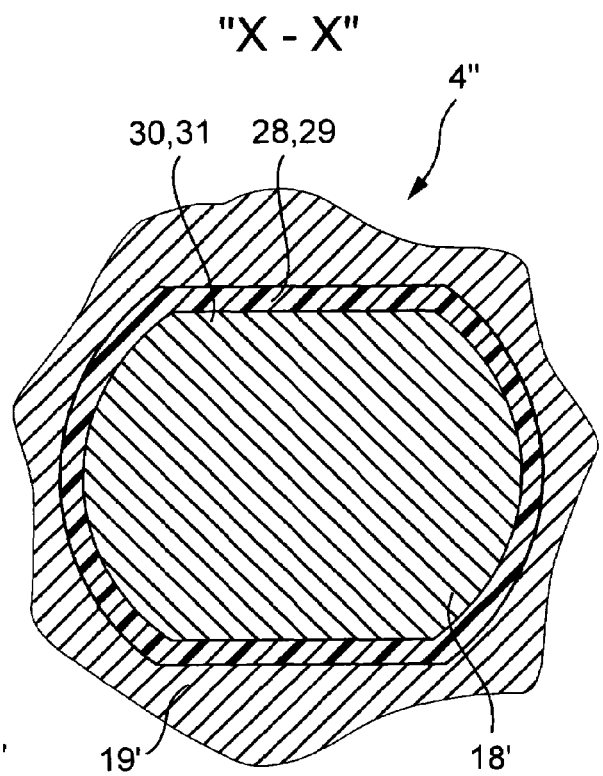
FIG. 9 a cross section X-X through the two-side shaft coupling from FIGS. 7 and 8.
Figure 8:
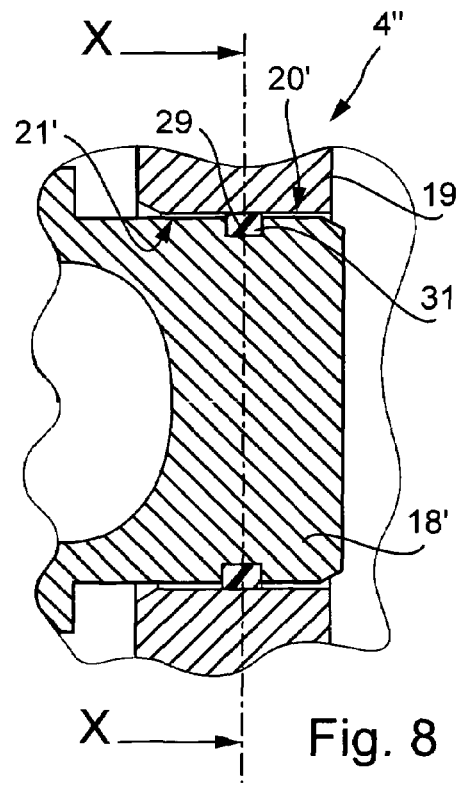
FIG. 8 a longitudinal section through a two-side shaft coupling similar to FIG. 7, but with an O-ring as a polymer spring.

In FIGS. 7 and 8, a two-side shaft coupling 4" is shown in a longitudinal section and in FIG. 9 in a cross section, for which, instead of the flat bending springs or plate springs 23, a polymer band 28 or a polymer O-ring 29 are provided. These are mounted in a circular groove 30, 31 of the inner parts 18' to their coupling surfaces 20' so that they project beyond the surfaces, so that in the installed state, they have biasing. Therefore, the play, which is also large for this variant, between the coupling surfaces 20', 21', is bridged between the inner and outer parts 18', 19', without these parts coming in contact. Here, the relatively low torque of the adjusting motor 3 is also transferred without relative rotation of the inner and outer parts 18', 19'based on the corresponding stiffness of the polymer band 28 and the polymer O-ring 29.

In FIG. 9, the circular groove 30, 31 can be recognized in the inner part 18' with the polymer band 28 and the polymer O-ring 29, which produce an optimum bridging of play between the inner parts 18' and the outer parts 19' of the coupling 4".

FIGS. 10 to 13 show cross sections through a tubular shaft coupling 32 with a hollow cylindrical outer part 33 and a coaxial, cylindrical inner part 34, which is arranged with play in the hollow cylindrical outer part 33.

Figures 10, 11:
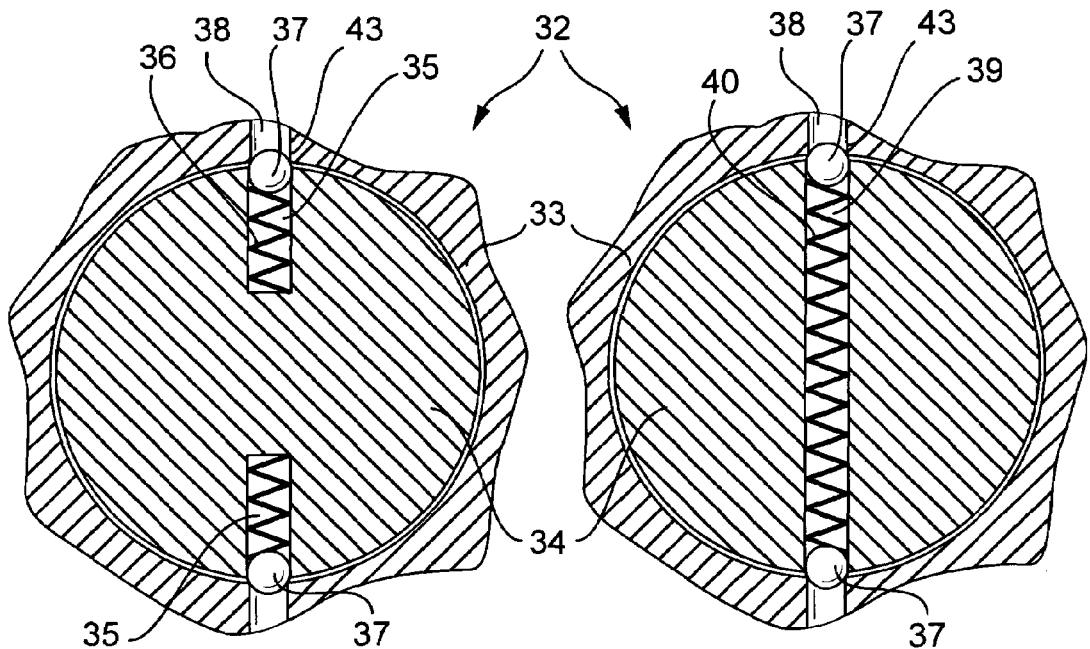
FIG. 10 a cross section through a tubular shaft coupling with two opposing, spring-loaded locking balls in separate radial bore holes of a coaxial, cylindrical inner part.
FIG. 11 a cross section through a tubular shaft coupling similar to FIG. 10, but with a radial through hole, in which a passage spring is arranged for the two locking balls.

In the cylindrical inner part 34 of FIG. 10, there are two identical, aligned radial bore holes 35, which extend from its periphery and in which a compression spring 36 is arranged. These springs each act on a locking ball 37, which are guided in the radial bore holes 35 with clearance and displace these balls into another radial bore hole 38 in the outer part 33. The other radial bore holes 38 are aligned in a certain rotational position of the cylindrical inner part 34 with the radial bore holes 35. Due to a certain, minimal diameter of the other radial bore holes 38 in relation to the radial bore holes 35, the locking balls 37 penetrate only up to a certain depth into the other radial bore hole 38, which is sufficient for transferring the torque of the adjusting motor 3. Here, the locking balls are supported on an outer edge 43 of the other radial bore hole 38. Through selection of the diameter of the other radial bore hole 38, the magnitude of the transferable torque can be defined. In this way, the tubular shaft coupling 32 becomes a safety coupling.

In FIG. 11, the two radial bore holes 35 are replaced by a through hole 39 with a through spring 40. This solution, in comparison with that from FIG. 10, has the advantage of minimal construction expense and uniform pressure loading of the two locking balls 37, which permits a more precise fixing of the transferable torque.

Figures 12, 13:
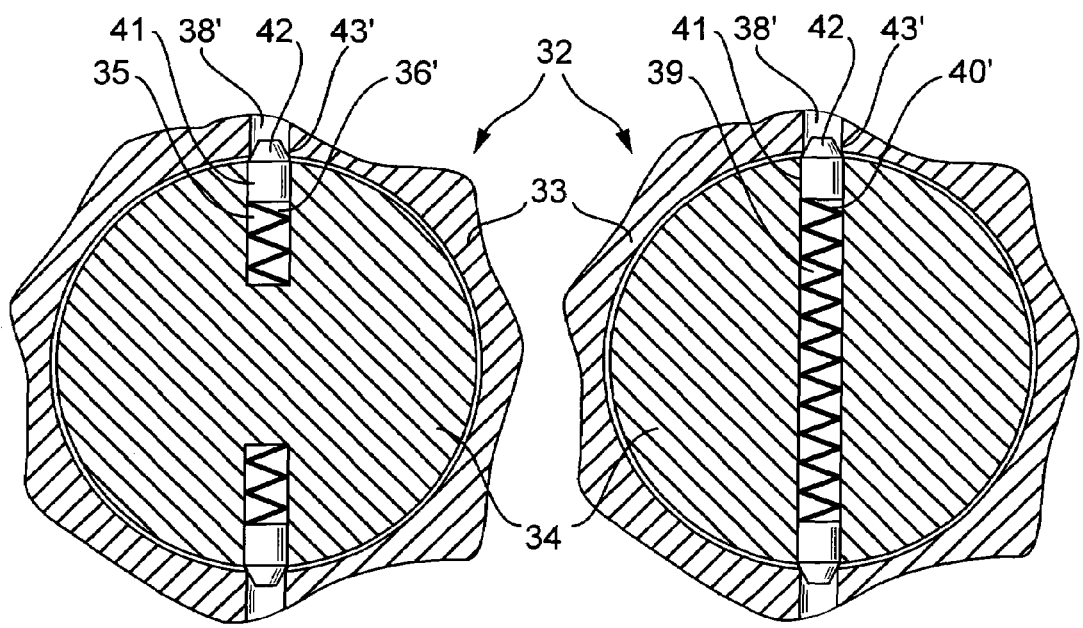
FIG. 12 a cross section through a tubular shaft coupling similar to FIG. 10, but with two cylindrical locking pins instead of the two locking balls.
FIG. 13 a cross section through a tubular shaft coupling similar to FIG. 11, but with two cylindrical locking pins instead of the two locking balls.

The structure of the tubular shaft couplings 32 of FIGS. 12 and 13 corresponds to that of FIGS. 10 and 11. The difference is in the use of cylindrical locking pins 41 instead of locking balls 37, with conical ends 42, which project by means of the pressure force of the compression springs 36' or the through spring 40', in the through hole 39 into other radial bore holes 38' and are supported on their outer edges 43'. In this variant, the transferable torque can be limited by the size of the cone angle of the conical ends 42. Therefore, this tubular shaft coupling 32 can also be used as a safety coupling.

Figure 14:
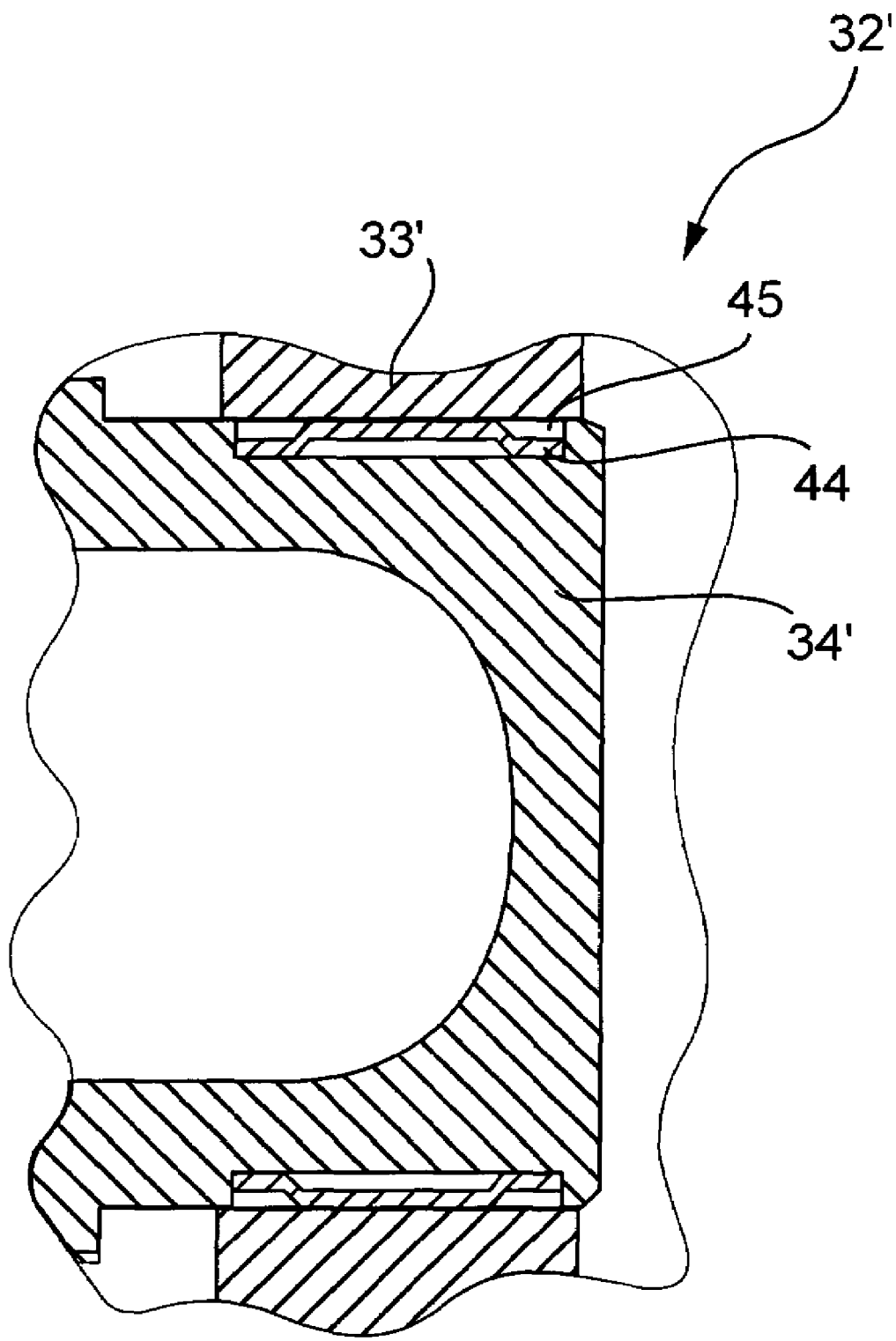
FIG. 14 a longitudinal section through a tubular shaft coupling with a cylindrical inner part, which has on its outer periphery an annular groove, in which an elastically deformable metal tolerance ring is located.

In FIG. 14, a tubular shaft coupling 32' is shown as another coupling variant. Here, a non-positive moment transfer between a cylindrical inner part 34' and a hollow cylindrical outer part 33' is achieved through a metallic tolerance ring 44, which is arranged in a radial groove 45 and which is elastically deformable. The tolerance ring 44 projects past the radial groove 45 by a certain extent, which defines the elastic deformation and the dependent force-fit connection.

Figures 15, 16:
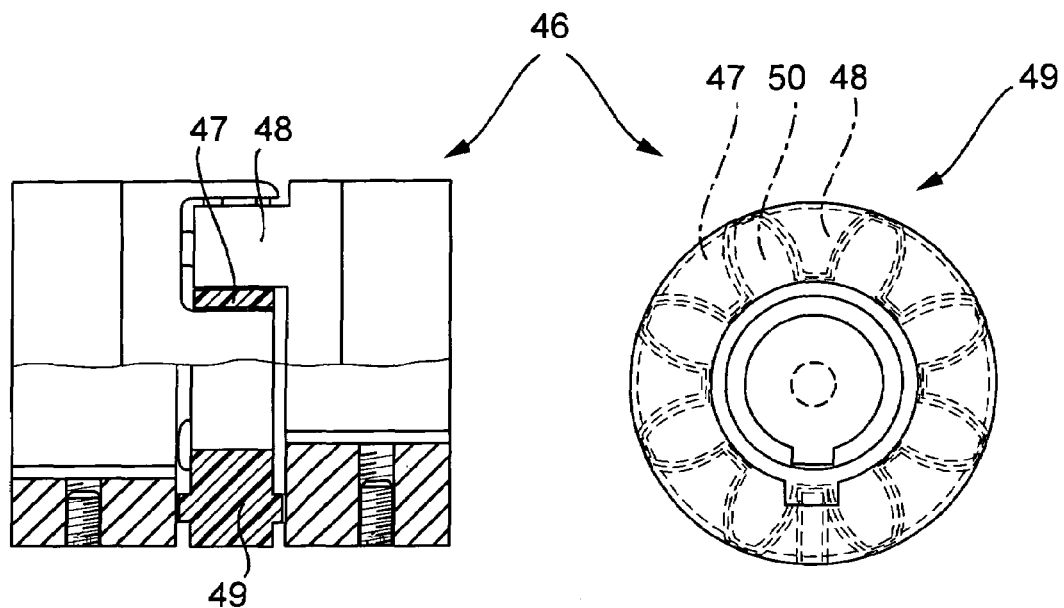
FIG. 15 a partial longitudinal section through a clutch coupling.
FIG. 16 an axial view of the clutch coupling from FIG. 15.
Figure 17:
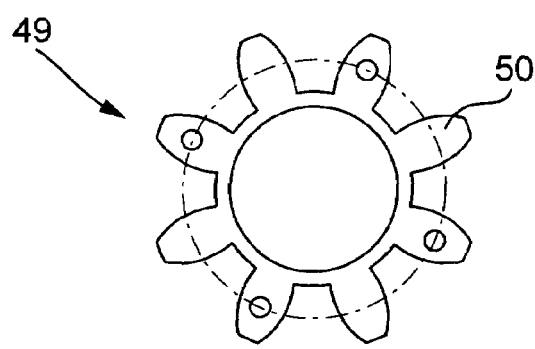
FIG. 17 a view of an elastomer collar of the clutch coupling from FIGS. 15 and 16.

In FIG. 15, a partial cross section through a clutch coupling 46 with claws 47, 48 is shown. These are rotationally fixed on the free ends of the adjusting shaft and adjusting motor shaft 9, 10 at the same diameter. They engage in each other with distances, which are bridged in a rotational backlash-free way by an elastic, biased polymer collar 49 with tooth elements 50 shown in FIG. 17.

FIG. 16 shows an axial view of the clutch coupling 46, in which eight claws 47 and 48, as well as the polymer collar 49 with eight tooth segments 50, are shown with dashed lines. The clutch coupling 46 compensates for small alignment errors between the adjusting shaft and the adjusting motor shaft 9, 10, and also permits a small axial displacement between the same.

Figures 18, 19:
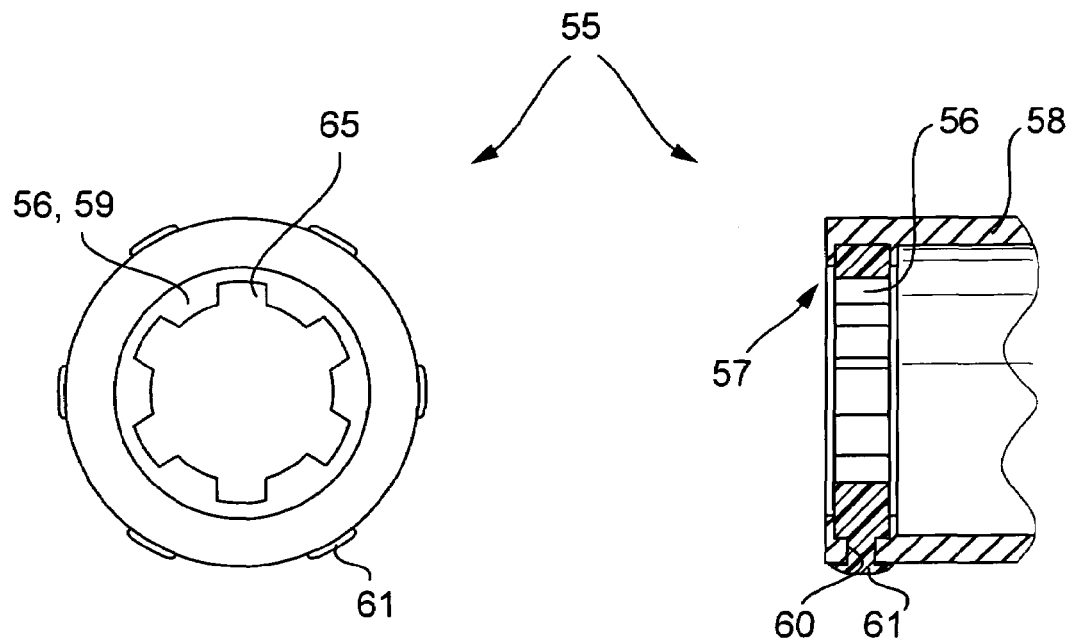
FIG. 18 an axial view of an outer part of a toothed shaft coupling with plastic internal gearing.
FIG. 19 a partial longitudinal section of the outer part from FIG. 18 with plastic internal gearing.

In FIG. 18, an axial view of an outer part 55 of a toothed shaft coupling with internal gearing 56 made from elastic plastic is shown. FIG. 19 shows a partial longitudinal section of the outer part 55 of FIG. 18. The internal gearing 56 is molded into a radial groove 57 of an intermediate bushing 58. In the radial projection, behind each tooth 59 there is a radial bore hole 60, which is filled with plastic and is sealed by a rivet head-like cover 61. The plastic located in the radial bore hole 60 increases the transferable torque of the internal gearing 56. The intermediate bushing 58 can be used as part of the adjusting shaft 9 or the adjusting motor shaft 10 or can be pressed into these parts.

Figures 20, 21:
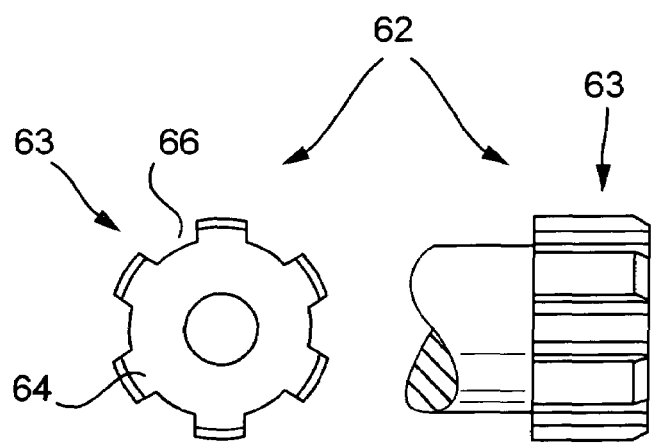
FIG. 20 an axial view of an inner part with metal external gearing fitted to the outer part of FIGS. 18 and 19.
FIG. 21 a side view of the inner part from FIG. 20.

FIGS. 20 and 21 show a metal inner part 62 with external gearing 63, which have external teeth 64. These are narrower than the plastic internal teeth 59, because they have a higher strength. Correspondingly, the internal teeth gaps 65 are narrower than the external teeth gaps 66. In principle, the external gearing 63 could also be formed in plastic. However, internal gearing 56 is also possible due to the possibly greater material volume.

Figure 22:
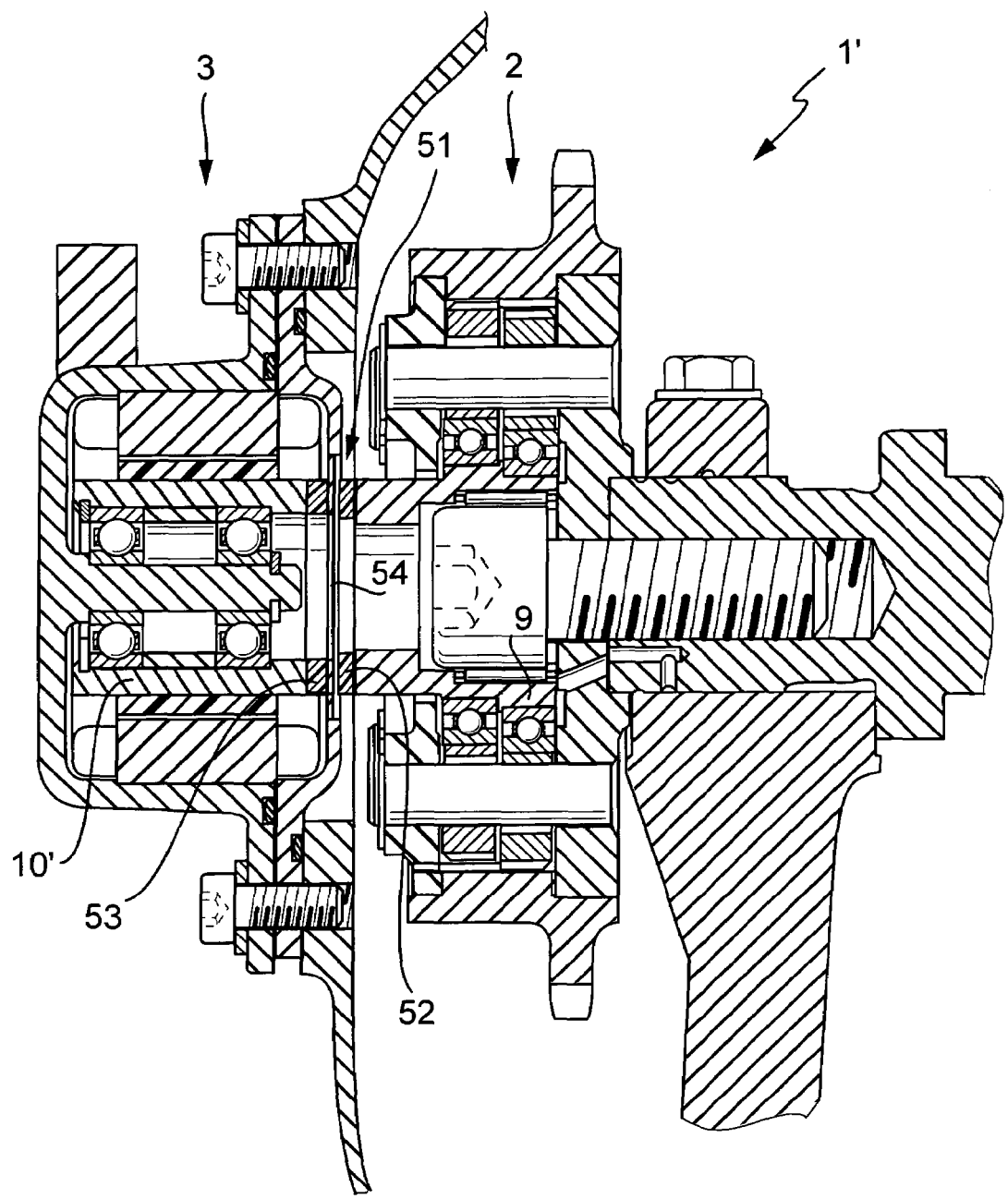
FIG. 22 a longitudinal section through a camshaft adjuster similar to FIG. 1, but with a magnetic shaft coupling instead of the two-side shaft coupling.

FIG. 22 shows a camshaft adjuster 1', whose adjusting shaft 9 is connected in a contact-less and rotational backlash-free way to the adjusting motor shaft 10' by a permanent magnet shaft coupling 51. Permanent magnets 52, 53 are fixed to the free ends of the adjusting shaft and the adjusting motor shaft 9, 10'. Between these magnets, there is a non-magnetic membrane 54, which closes the adjusting motor 3 in an oil-tight way. In this way, the adjusting motor 3 is hermetically sealed without friction-generating sealing elements.

LIST OF REFERENCE SYMBOLS 1, 1' Camshaft adjuster
2 Adjusting gear mechanism
3 Electrical adjusting motor
4, 4', 4" Two-side shaft coupling
5 Chain wheel
6 Closing wall
7 Tension screw
8 Camshaft
9 Adjusting shaft
10, 10' Adjusting motor shaft
11 Spur pinion
12 Spur pinion
13 Internal gearing
14 Pin
15 Stator
16 Cylinder head
17 Permanent magnet rotor
18, 18' Inner part
19, 19' Outer part
20, 20' Coupling surface
21, 21' Coupling surface
22 Groove
23 Flat bending or plate spring
24 Spring clip
25 Spring clasp
26 Corner.
27 Transverse groove
28 Polymer band
29 Polymer O-ring
30 Circular groove
31 Circular groove
32, 32' Tubular shaft coupling
33, 33' Hollow cylindrical outer part
34, 34' Coaxial, cylindrical inner part
35 Radial bore hole
36, 36' Compression spring
37 Locking ball
38, 38' Other radial bore hole
39 Through hole
40, 40' Through spring
41 Cylindrical locking pin
42 Conical end
43, 43' Outlet edge
44 Tolerance ring
45 Radial groove
46 Clutch coupling
47 Claw
48 Claw
49 Polymer collar
50 Tooth element
51 Permanent magnet shaft coupling
52 Permanent magnet
53 Permanent magnet
54 Membrane
55 Outer part
56 Internal gearing
57 Radial groove
58 Intermediate bushing
59 Internal tooth
60 Radial bore hole
61 Cover
62 Inner part
63 External gearing
64 External tooth
65 Internal teeth gaps 66 External teeth gaps

The invention claimed is:

1. A camshaft adjuster (1, 1') for adjusting and fixing a position of the angle of rotation of a camshaft (8) relative to a crankshaft of a reciprocating-piston internal-combustion engine comprising:
   a high transmission and friction-reduced adjusting gear mechanism (2) comprising a drive shaft rotationally fixed to the crankshaft;
   a driven shaft rotationally fixed to the camshaft (8); and
   an adjusting shaft (9) connected to an adjusting motor shaft (10) of an adjusting motor,
   wherein the adjusting gear mechanism (2) and the adjusting motor (3) are formed as separate units and are connected to each other by a rotational backlash-free, disengaging coupling (4, 4', 4"; 32, 32'; 46; 51),
   the adjusting motor is an electric adjusting motor (3),
   the coupling (4, 4', 4"; 32, 32'; 46; 51) has two parts, which can be joined together and of which one is rotationally fixed to the adjusting motor shaft (10) and the other is rotationally fixed to the adjusting shaft (9) or are formed integrally with the shafts (9, 10),
   one of the two parts is formed as the outer part (19, 19'; 33, 33') and the other is formed as the inner part (18, 18'; 34, 34'), and the two parts can be inserted one into the other in a rotational backlash-free way, and
   the coupling is formed as a profiled shaft coupling, as a two-side shaft coupling (4, 4',4"), which has two coupling surfaces (21, 21') on the outer part (19, 19') and two coupling surfaces (20, 20') on the inner part (18, 18'), and rotational backlash-reducing means are provided on the latter.

2. The camshaft adjuster according to claim 1, wherein a minimal, tightly tolerance play is provided as the rotational backlash-reducing means between the coupling surfaces (20, 21) of the inner and outer parts (18, 19).

3. The camshaft adjuster according to claim 1, wherein biased metal or plastic springs, which bridge the play between the coupling surfaces (20', 21'), are provided as the rotational backlash-reducing means.

4. The camshaft adjuster according to claim 3, wherein the springs are metal and are formed as flat bending or plate springs (23).

5. The camshaft adjuster according to claim 4, wherein the flat bending or plate springs (23) are formed as one-piece spring clasps (25), which engage at corners (26) of the inner part (18').

6. The camshaft adjuster of claim 3, wherein the springs are plastic and are formed as a polymer band (28) or as a polymer O-ring (29) and are arranged in grooves (22) or a circular groove (30, 31) of the coupling surfaces (20') of the inner part (18').

7. The camshaft adjuster according to claim 1, wherein the coupling is formed as a magnetic shaft coupling (51), whose two parts have opposing permanent magnets (52, 53), which transfer a driving moment of the adjusting motor (3) through magnetic forces in a contact-less and rotational backlash-free way from the adjusting motor shaft (10') to the adjusting shaft (9).

8. A camshaft adjuster (1, 1') for adjusting and fixing a position of the angle of rotation of a camshaft (8) relative to a crankshaft of a reciprocating-piston internal-combustion engine comprising:
   a high transmission and friction-reduced adjusting gear mechanism (2) comprising a drive shaft rotationally fixed to the crankshaft;
   a driven shaft rotationally fixed to the camshaft (8); and
   an adjusting shaft (9) connected to an adjusting motor shaft (10) of an adjusting motor,
   wherein the adjusting gear mechanism (2) and the adjusting motor (3) are formed as separate units and are connected to each other by a rotational backlash-free, disengaging coupling (4, 4', 4"; 32, 32'; 46; 51),
   the adjusting motor is an electric adjusting motor (3),
   the coupling (4, 4', 4"; 32, 32'; 46; 51) has two parts, which can be joined together and of which one is rotationally fixed to the adjusting motor shaft (10) and the other is rotationally fixed to the adjusting shaft (9) or are formed integrally with the shafts (9, 10),
   one of the two parts is formed as the outer part (19, 19'; 33, 33') and the other is formed as the inner part (18, 18'; 34, 34'), and the two parts can be inserted one into the other in a rotational backlash-free way, and
   the coupling is formed as a tubular shaft coupling (32, 32'), comprising a hollow cylindrical outer part (33, 33') and a coaxial, cylindrical inner part (34, 34'), which is arranged with play in the outer part (33, 33') and which has rotational backlash-reducing means.

9. The camshaft adjuster according to claim 8, wherein an elastically deformable, metal tolerance ring (44) is provided as the rotational backlash-reducing means, which is arranged in a radial groove (45) on a periphery of the coaxial, cylindrical inner part (34') and projects beyond the groove by a certain extent in a radial direction.

10. The camshaft adjuster according to claim 8, wherein at least one locking ball (37) or one cylindrical locking pin (41) with a conical end (42) is provided as the rotational backlash-reducing means, which are guided in radial or through bore holes (35, 39) of the coaxial, cylindrical inner part (34) with play and which can be moved into other radial bore holes (38, 38') of smaller diameter, which are aligned with the through bore holes, in the hollow cylindrical outer part (33) under the force of a compression or through spring (36, 36'; 40, 40') by an extent limited by a smaller diameter.

11. The camshaft adjuster according to claim 10, wherein the other radial bore holes (38, 38') are formed as elongated holes aligned in an axial direction.

12. A camshaft adjuster (1, 1') for adjusting and fixing a position of the angle of rotation of a camshaft (8) relative to a crankshaft of a reciprocating-piston internal-combustion engine comprising:
   a high transmission and friction-reduced adjusting gear mechanism (2) comprising a drive shaft rotationally fixed to the crankshaft;
   a driven shaft rotationally fixed to the camshaft (8); and
   an adjusting shaft (9) connected to an adjusting motor shaft (10) of an adjusting motor,
   wherein the adjusting gear mechanism (2) and the adjusting motor (3) are formed as separate units and are connected to each other by a rotational backlash-free, disengaging coupling (4, 4', 4"; 32, 32'; 46; 51),
   the adjusting motor is an electric adjusting motor (3),
   the coupling (4, 4', 4"; 32, 32'; 46; 51) has two parts, which can be joined together and of which one is rotationally fixed to the adjusting motor shaft (10) and the other is rotationally fixed to the adjusting shaft (9) or are formed integrally with the shafts (9, 10), and
   the coupling is formed as a clutch coupling (46), whose two parts have axial claws (47, 48), which are arranged at the same diameter and which engage in each other, and between the claws (47, 48) there are spaces, which are bridged in a rotational backlash-free way by tooth elements (50) of an elastic, biased polymer collar (49).

13. A camshaft adjuster (1, 1') for adjusting and fixing a position of the angle of rotation of a camshaft (8) relative to a crankshaft of a reciprocating-piston internal-combustion engine comprising:
- a high transmission and friction-reduced adjusting gear mechanism (2) comprising a drive shaft rotationally fixed to the crankshaft;
- a driven shaft rotationally fixed to the camshaft (8); and
- an adjusting shaft (9) connected to an adjusting motor shaft (10) of an adjusting motor,
- wherein the adjusting gear mechanism (2) and the adjusting motor (3) are formed as separate units and are connected to each other by a rotational backlash-free, disengaging coupling (4, 4', 4"; 32, 32'; 46, 51),
- the adjusting motor is an electric adjusting motor (3),
- the coupling (2, 4', 4"; 32, 32'; 46, 51) has two parts, which can be joined together and of which one is rotationally fixed to the adjusting motor shaft (10) and the other is rotationally fixed to the adjusting shaft (9) or are formed integrally with the shafts (9, 10),
- one of the two parts is formed as the outer part (19, 19'; 33, 33') and the other is formed as the inner part (18, 18'; 34, 34'), and the two parts can be inserted one into the other in a rotational backlash-free way, and
- the coupling is formed as a profiled shaft coupling comprising a toothed shaft coupling, whose outer or inner part (55, 65) includes internal or external gearing (56, 63), that is formed from elastic plastics.

14. The camshaft adjuster according to claim 13, wherein the plastic external gearing (56, 63) is molded directly on corresponding parts of the toothed shaft coupling or on a correspondingly formed, metallic intermediate bushing (58) and the intermediate bushing (58) is connected to the toothed shaft coupling by a force-fit connection.

15. A camshaft adjuster (1, 1') for adjusting and fixing a position of the angle of rotation of a camshaft (8) relative to a crankshaft of a reciprocating-piston internal-combustion engine comprising:
- a high transmission and friction-reduced adjusting gear mechanism (2) comprising a drive shaft rotationally fixed to the crankshaft;
- a driven shaft rotationally fixed to the camshaft (8); and
- an adjusting shaft (9) connected to an adjusting motor shaft (10) of an adjusting motor,
- wherein the adjusting gear mechanism (2) and the adjusting motor (3) are formed as separate units and are connected to each other by a rotational backlash-free, disengaging coupling (4, 4', 4"; 32, 32'; 46; 51),
- the adjusting motor is an electric adjusting motor (3),
- the coupling (4, 4', 4"; 32, 32'; 46, 51) has two parts, which can be joined together and of which one is rotationally fixed to the adjusting motor shaft (10) and the other is rotationally fixed to the adjusting shaft (9) or are formed integrally with the shafts (9, 10),
- the coupling is formed as a magnetic shaft coupling (51), whose two parts have opposing permanent magnets (52, 53), which transfer a driving moment of the adjusting motor (3) through magnetic forces in a contact-less and rotational backlash-free way from the adjusting motor shaft (10') to the adjusting shaft (9), and
- the permanent magnets (52, 53) are arranged in an axial direction and that between the magnets there is a non-magnetic membrane (54) with two-sided play, which seals the adjusting motor (3) in an oil-tight manner.

\* \* \* \* \*